United States Patent [19]

Scherzer et al.

[11] Patent Number: 5,246,993
[45] Date of Patent: Sep. 21, 1993

[54] OLIGOMERIC CARBODIIMIDES

[75] Inventors: Deitrich Scherzer, Neustadt; Roland Minges, Gruenstadt; Friedhelm Lehrich, Speyer; Werner Langer, Ludwigshafen, all of Fed. Rep. of Germany

[73] Assignee: BASF Aktiengesellschaft, Fed. Rep. of Germany

[21] Appl. No.: 927,089

[22] Filed: Aug. 7, 1992

[30] Foreign Application Priority Data

Aug. 9, 1991 [DE] Fed. Rep. of Germany ....... 4126359

[51] Int. Cl.$^5$ ............................................. C08G 18/30
[52] U.S. Cl. ...................................... 524/195; 528/49; 528/51; 528/67; 560/198; 564/252
[58] Field of Search ................ 524/195; 528/49, 51, 528/67; 560/198; 564/252

[56] References Cited

U.S. PATENT DOCUMENTS

| | | | |
|---|---|---|---|
| 2,941,966 | 6/1960 | Campbell | 528/51 |
| 2,941,983 | 5/1921 | Smeltzer | 528/44 |
| 4,071,503 | 1/1978 | Thomas et al. | 560/198 |
| 4,076,945 | 2/1978 | Elmer | 564/252 |
| 4,604,210 | 8/1986 | Lin | 564/252 |

FOREIGN PATENT DOCUMENTS

| | | |
|---|---|---|
| 2043820 | 12/1991 | Canada . |
| 449143 | 10/1991 | European Pat. Off. . |
| 460481 | 12/1991 | European Pat. Off. . |
| 2248751 | 4/1973 | Fed. Rep. of Germany . |
| 2304635 | 10/1976 | France . |

*Primary Examiner*—Maurice J. Welsh
*Attorney, Agent, or Firm*—Dennis V. Carmen

[57] ABSTRACT

Oligomeric carbodiimides having an average degree of condensation of from 2 to 30, obtainable by oligocondensation of a) from 40 to 100 mol % of 2,4'-diisocyanatodiphenylmethane or of a 3,3',5,5'-tetra-$C_1$-$C_4$-alkyl-4,4'-diisocyanatodiphenylmethane and b) from 0 to 60 mol % of a further bi- or polyfunctional aromatic isocyanate and c) if desired, complete or partial reaction of the remaining free isocyanate groups of the oligomers with an aliphatic, araliphatic or cycloaliphatic alcohol or amine, are used mainly for stabilizing polyester-containing polyurethanes against hydrolytic degradation.

30 Claims, No Drawings

OLIGOMERIC CARBODIIMIDES

The present invention relates to oligomeric carbodiimides having an average degree of condensation of from 2 to 30, obtainable by oligocondensation of
a) from 40 to 100 mol % of 2,4′-diisocyanatodiphenylmethane or of a 3,3′,5,5′-tetra-$C_1$-$C_4$-alkyl-4,4′-diisocyanatodiphenylmethane and
b) from 0 to 60 mol % of a further bi- or polyfunctional aromatic isocyanate and
c) if desired, complete or partial reaction of the remaining free isocyanate groups of the oligomers with an aliphatic, araliphatic or cycloaliphatic alcohol or amine.

The present invention furthermore relates to processes for the preparation of oligomeric carbodiimides, the use thereof as water acceptors and acid acceptors in materials sensitive to hydrolysis, and the materials stabilized with these carbodiimides, and the use thereof for terminating esterification reactions, in particular in the case of the preparation of polyesterols.

U.S. Pat. No. 2,941,983 discloses oligomeric and polymeric carbodiimides which have terminal urethane groups, are based on mononuclear or dinuclear aromatic diisocyanates and are recommended as antistatic agents for polyester fabrics and for the production of fibers, films and coatings.

Furthermore, DE-A 22 48 751 discloses oligomeric and polymeric carbodiimides which have urethane groups and are based on aromatic diisocyanates whose isocyanate groups have different reactivities. They are prepared by first converting some of the more rapidly reacting isocyanate groups with an alcohol into the corresponding urethane groups and then effecting carbodiimide formation via the remaining isocyanate groups. These carbodiimides are used for stabilizing polyesterurethane rubbers against hydrolytic degradation but are unsatisfactory in this respect.

Low molecular weight carbodiimides, for example those based on 2,6-diisopropylphenyl isocyanate, are also used as stabilizers for polyesterurethane rubbers (Kunststoff-Handbuch, Volume 7, Polyurethane, 2nd Edition (1983), Hanser-Verlag, page 408).

Owing to their low molecular weight, products based on 2,6-diisopropylphenyl isocyanate tend to bloom from polyurethane rubbers.

According to DD-A 132 969, polyesterurethanes stabilized against hydrolysis are obtained if the polyesterols used are treated with carbodiimides or polycarbodiimides prior to conversion into the polyurethane, in order to remove traces of acid. Suitable compounds of this type are polysubstituted diarylcarbodiimides, such as 2,2′,6,6′-tetraisopropyldiphenylcarbodiimide.

It is an object of the present invention to provide novel oligocarbodiimides which are more suitable than the previously known compounds of this type for stabilizing substances sensitive to hydrolysis, in particular esters and polymers which contain ester groups.

We have found that this object is achieved by the oligomeric carbodiimides defined at the outset.

We have also found processes for the preparation of these oligomeric carbodiimides and esters and polymers which are sensitive to hydrolysis and have been stabilized with these compounds. We have furthermore found that esterification reactions can be effectively terminated on reaching the desired conversion by means of the novel oligomeric carbodiimides.

The diisocyanates (a)

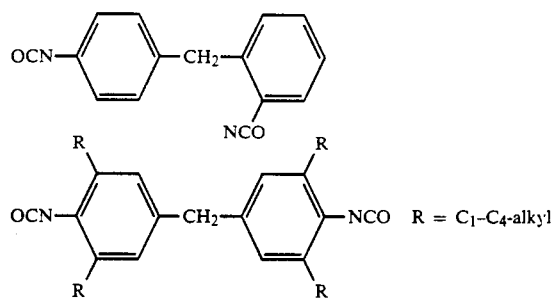

on which the oligomeric carbodiimides are based are for the most part known and can be prepared from the corresponding amines by reaction with phosgene. The preparation methods are described, for example, in Kunststoff-Handbuch, Volume 7, Polyurethane, 2nd Edition (1983), Hanser-Verlag, on pages 63 to 69.

Preferred oligomeric carbodiimides are those which are synthesized from compounds (a) alone. However, cooligomers containing not more than 60, preferably not more than 30, mol % of other bi- or polyfunctional aromatic isocyanates (b) also have good performance characteristics.

Suitable isocyanates (b) are mainly dinuclear compounds, such as 4,4′-diisocyanatodiphenylmethane or naphthalene 1,5-diisocyanate, and polynuclear isocyanates having a higher functionality, as are obtained in the preparation of 4,4′-diisocyanatodiphenylmethane. The amount of these isocyanates having a higher functionality is preferably from 0.5 to 5% by weight, based on the mixture of (a) and (b).

Oligomeric carbodiimides having an average degree of condensation of from 2 to 10 are preferred since, as a rule, they can be particularly readily incorporated into the materials to be stabilized. Carbodiimides having a higher degree of condensation are generally solid and have a high melting point and are therefore more difficult to mix homogeneously with the polymeric materials.

Since the oligomeric carbodiimides obtained from components (a) and (b) still carry free isocyanate groups, they have only a limited shelf life and must therefore be used rapidly. Novel compounds whose isocyanate groups have been saturated with an alcohol or amine (c) with formation of urethane or urea groups are therefore generally preferred.

The chemical nature of the alcohols and amines (c) is less important here, provided that these do not contain any reactive groups, for example carboxyl groups, although this is self-evident. Alcohols are generally preferred, i.e. $C_1$-$C_{18}$-alcohols, such as methanol, ethanol, propanol, butanol, isopropanol, 2-ethylhexanol and dodecanol, $C_2$-$C_8$-alkanols being especially suitable.

Amines, preferably secondary dialkylamines having a total of from 2 to 12 carbon atoms, such as diethylamine, dipropylamine and dibutylamine, are also suitable but have the disadvantage of a generally unpleasant odor, necessitating the removal of unconverted residual amounts, which is technically complicated.

The oligocondensation of the isocyanates (a) and (b) can be carried out at from 50° to 200° C. Corresponding processes are described by W. Neumann and P. Fischer, Angew. Chemie 74 (1962), 801, the presence of catalysts being advisable. Particularly suitable catalysts are phospholene oxides. Sterically relatively unhindered isocyanates, such as 4,4'-diisocyanatodiphenylmethane, can be converted at below 100° C., preferably at from 40° to 100° C. Sterically hindered isocyanates, such as 3,3'-,5,5'-tetraisopropyl-4,4'-diisocyanatodiphenylmethane, are preferably converted at from 100° to 180° C.

Through the choice of the reaction conditions, such as the temperature, the type of catalyst and the amount of catalyst, and of the reaction time, the skilled worker can adjust the degree of condensation in the conventional manner. The course of the reaction can be monitored most simply by determining the NCO content. Other parameters too, such as increase in viscosity, deepening of color or evolution of $CO_2$, can be used for monitoring and controlling the reaction.

As is generally advisable for the abovementioned reasons, the free isocyanate groups are reacted with an alcohol or amine after the end of the condensation, by adding these components, preferably in slight excess, to the condensate, allowing them to react and then distilling off the residual amount under reduced pressure.

In a preferred embodiment, the novel carbodiimides can be prepared by a method in which first not more than 60%, preferably not more than 40%, of the isocyanate groups (a) and/or (b) are reacted with an alcohol or amine (c) and then the condensation reaction is carried out This method can be successfully carried out particularly in the case of diisocyanates whose isocyanate groups have different reactivities, because in this case the less desirable reaction of both isocyanate groups of one and the same molecule rarely takes place.

Since monofunctional chain-terminating compounds are already present in the condensation in this process, the process makes it possible to establish a relatively uniform degree of condensation. If the amount of alcohol or amine is, for example, 20 mol %, based on the amount of all isocyanate groups, this gives an average degree of condensation of 5, which, on the basis of observations to date, also corresponds rapidly to the actual degree of condensation. In the case of 50 mol %, dimers are obtained in theory, and with amounts of alcohol or amine of more than 50 mol % not only dimeric carbodiimides but also the corresponding bisurethanes or bisureas of the diisocyanates used are obtained, and although these do not have the diimide function desirable per se, they facilitate incorporation of the carbodiimides into the plastic materials.

The novel oligomeric carbodiimides are very suitable as acid acceptors and hence as stabilizers against hydrolytic degradation of esters. In particular, they are suitable as stabilizers for polyester-containing plastics, such as polyesterurethane rubbers.

The novel oligomeric carbodiimides have a long term effect which is presumably due to the fact that the carbodiimide groups are relatively insensitive to water, are thus not prematurely deactivated by water and are therefore available for a relatively long time for reaction with traces of acid which catalyze the breaking of the ester bonds.

The concentration of the oligomeric carbodiimides in materials to be stabilized is in general from 0.1 to 2% by weight. In individual cases, the concentration may also be higher, for example up to 5% by weight, depending on the hydrolytic stress.

The novel oligomeric carbodiimides are also suitable for the deacidification of polyesterols which are used for the preparation of polyester-containing plastics, in particular polyesterurethane rubbers.

Another important application is for the termination of esterification reactions, especially in the preparation of polyesters, when the desired degree of polycondensation has been reached.

The novel oligomeric carbodiimides furthermore have the advantage that they are compatible with polyesterols and with polymers containing esters groups, in particular with polyesterurethane rubbers, and, owing to their low melting point, can also readily be homogeneously mixed with these materials in the melt. Another advantage is that the novel oligocarbodiimides are not prone to blooming.

EXAMPLES

A) Preparation of the oligomeric carbodiimides

Example 1 (Comparative Example)

250 g (1 mol) of 4,4'-diisocyanatodiphenylmethane (4,4'-MDI) were reacted at 80° C. with the addition of 500 ppm of 1-methylpholene 1-oxide until the NCO content was 60% of the initial value. The catalyst was then removed by distillation at 180° C. and 0.1 mbar.

The NCO content of the product was 13.5% by weight (40% of the initial value). The product melts at from 70° to 120° C. From the conversion of the NCO groups, the average degree of condensation is calculated as 2.5.

Example 2

250 g (1 mol) of 2,4'-diisocyanatodiphenylmethane (2,4'-MDI) were reacted similarly to Example 1.

The NCO content of the product after the catalyst had been distilled off was 12% by weight (36% of the initial value).

The product melts at from 60° to 100° C. From the conversion of the NCO groups, the average degree of condensation is calculated as 2.8.

Example 3

362 g (1 mol) of 3,3',5,5'-tetraethyl-4,4'-diisocyanatodiphenylmethane (TE-MDI) were reacted similarly to Example 1 at 130° C.

The NCO content of the product after the catalyst had been distilled off was 7.4% by weight (32% of the initial value).

The product melts at from 100° to 150° C. From the conversion of the NCO groups, the average degree of condensation is calculated as 3.1

Example 4

418 g (1 mol) of 3,3',5,5'-tetraisopropyl-4,4'-diisocyanatodiphenylmethane (TIP-MDI) were reacted similarly to Example 1 at 140° C.

The NCO content of the polymeric product after the catalyst had been distilled off was 8.0% by weight (40% of the initial value).

The product melts at from 100° to 150° C. From the conversion of the NCO groups, the average degree of condensation is calculated as 2.5.

Example 5 (Comparative Example)

250 g (1 mol) of 4,4'-diisocyanatodiphenylmethane were reacted at 80° C. with the addition of 500 ppm of 1-methylpholene 1-oxide until the NCO content had decreased to 12.5% by weight (37% of the initial value). 41.4 g (0.9 mol) of ethanol were then added. After 30 minutes, the catalyst and the excess alcohol were distilled off at 180° C. and 0.1 mbar.

From the conversion of the NCO groups, the average degree of condensation was calculated as 2.7.

The product melts at from 80° to 120° C. It is soluble in polyurethane rubber and polyesterols.

Example 6

250 g (1 mol) of 4,4'-diisocyanatodiphenylmethane were reacted similarly to Example 5, with the addition of 0.9 mol (117 g) of 2-ethylhexanol.

The product melts at from 70° to 100° C. It is soluble in polyurethane rubber and polyesterols. The calculated degree of conversion is 2.7.

Example 7

250 g (1 mol) of 2,4'-diisocyanatodiphenylmethane were reacted similarly to Example 5.

The product melts at from 60° to 90° C. It is soluble in polyurethane rubber and polyesterols. The calculated degree of condensation is 2.7.

Example 8

250 g (1 mol) of 2,4'-diisocyanatodiphenylmethane were reacted similarly to Example 5, with the addition of 0.9 mol (117 g) of 2-ethylhexanol.

The product melts at from 50° to 90° C. It is soluble in polyurethane rubber and polyesterols. The calculated degree of condensation is 2.7.

Example 9

A mixture of 125 g (1 mol) of 2,4'-diisocyanatodiphenylmethane and 125 g (0.5 mol) of 4,4'-diisocyanatodiphenylmethane was reacted similarly to Example 5, with the addition of 0.9 mol (117 g) of 2-ethylhexanol.

The product melts at from 60° to 90° C. It is soluble in polyurethane rubber and polyesterols. The calculated degree of condensation is 2.7.

Example 10

362 g (1 mol) of 3,3',5,5'-tetraethyl-4,4'-diisocyanatodiphenylmethane were reacted similarly to Example 5.

The product melts at from 90° to 130° C. It is soluble in polyurethane rubber and polyesterols. The calculated degree of condensation is 2.7.

Example 11

362 g (1 mol) of 3,3',5,5,-tetraethyl-4,4'diisocyanatodiphenylmethane were reacted similarly to Example 5, with the addition of 0.9 mol (117 g) of 2-ethylhexanol.

The product melts at from 70° to 110° C. It is soluble in polyurethane rubber and polyesterols. The calculated degree of condensation is 2.7.

Example 12

418 g (1 mol) of 3,3',5,5'-tetraisopropyl-4,4'-diisocyanatodiphenylmethane were reacted similarly to Example 5.

The product melts at from 100° to 140° C. It is soluble in polyurethane rubber and polyesterols. The calculated degree of condensation is 2.7.

Example 13

418 g (1 mol) of 3,3',5,5'-tetraisopropyl-4,4'-diisocyanatodiphenylmethane were reacted similarly to Example 5, with the addition of 0.9 mol (117 g) of 2-ethylhexanol.

The product melts at from 90° to 130° C. It is soluble in polyurethane rubber and polyesterols. The calculated degree of condensation is 2.7.

B) Performance characteristics

Rectangular test panels (200 mm × 100 mm × 15 mm) of a thermoplastic polyesterpolyurethane which was synthesized from 430 g (1.72 mol) of 4,4'-diisocyanatodiphenylmethane, 1,000 g (0.5 mol) of butyl hexamethyladipate (molecular weight 2,000) and 110 g (1.72 mol) of butane-1,4-diol were stored in water at 95° C. over a period of 16 days. The hardness was 85 Shore A. 1% by weight of the corresponding carbodiimide was incorporated into the polyurethane in each case.

The K values (solution viscosity, 0.5% strength by weight in dimethylformamide, according to DIN 53,726) were measured before the beginning of the tests and after 8 and 16 days.

Since the K values correlate with the molecular weight, a decrease means that the thermoplastic polyurethane rubber is hydrolytically degraded during the test period.

The details of these tests are shown in the Table below. Test No. 14 was carried out without the addition of carbodiimide.

TABLE

| Test No. | Example No. | Oligomeric carbodiimide based on diisocyanate | alcohol | K value At the start | After 8 days | After 16 days |
|---|---|---|---|---|---|---|
| According to the invention | | | | | | |
| 1 | 2 | 2,4'-MDI | — | 71 | 57 | 38 |
| 2 | 3 | TE—MDI | — | 71 | 62 | 49 |
| 3 | 4 | TIP—MDI | — | 71 | 60 | 51 |
| 4 | 7 | 2,4'-MDI | Ethanol | 71 | 62 | 39 |
| 5 | 8 | 2,4'-MDI | 2-Ethylhexanol | 71 | 61 | 40 |
| 6 | 9 | 2,4'/4,4'-MDI | 2-Ethylhexanol | 71 | 57 | 31 |
| 7 | 10 | TE—MDI | Ethanol | 71 | 64 | 42 |
| 8 | 11 | TE—MDI | 2-Ethylhexanol | 71 | 65 | 59 |
| 9 | 12 | TIP—MDI | Ethanol | 71 | 66 | 58 |
| 10 | 13 | TIP—MDI | 2-Ethylhexanol | 71 | 65 | 60 |
| For comparison | | | | | | |
| 11 | 1 | 4,4'-MDI | — | 71 | 53 | 34 |
| 12 | 5 | 4,4'-MDI | Ethanol | 71 | 50 | 23 |
| 13 | 6 | 4,4'-MDI | 2-Ethylhexanol | 71 | 51 | 19 |
| 14 | — | No carbodiimide added | | 71 | 42 | 19 |

Test 15

800 g of a polyesterol of butane-1,4-diol, hexane-1,6-diol and adipic acid, having a molecular weight of about 2,000 and an acid number of 0.35 mg of KOH/g, were treated for 30 minutes at 180° C. with 4 g of the oligomeric carbodiimide according to Example No. 13, the acid number decreasing to 0.026 mg of KOH/g.

A thermoplastic polyurethane rubber based on this polyesterdiol lost 17% of its tensile strength in the course of 5 days in the hydrolysis test (water, 95° C.).

When the unpretreated polyesterol was used for producing the test panel, the latter lost more than 90% of its tensile strength in the course of 5 days in the hydrolysis test.

Test 16

800 g of a polyesterol of butane-1,4-diol, hexane-1,6-diol and adipic acid, having a molecular weight of about 2,000 and an acid number of 0.35 mg of KOH/g, was treated for 30 minutes at 180° C. with 8 g of an oligomeric carbodiimide according to Example No. 9, the acid number decreasing to 0.035 mg of KOH/g.

A thermoplastic polyurethane rubber based on this polyesterol lost 26% of its tensile strength in the course of 5 days in the hydrolysis test (water, 95° C.).

When the unpretreated polyesterol was used for producing the test panel, the latter lost more than 90% of its tensile strength in the course of 5 days in the hydrolysis test.

Test 17

In the preparation of a polyesterol from butane1,4-diol, hexane-1,6-diol and adipic acid, the esterification was not carried out until the usual acid number of 0.3 mg of KOH/g was reached but was terminated at an acid number of 0.5 mg of KOH/g by adding 0.6% by weight of the carbodiimide according to Example No. 13.

Here, the preparation time for the ester decreased from 12 hours (without termination of the reaction) to 10 hours.

The polyesterol had an acid number of 0.045 mg of KOH/g. It did not show any differences in the performance characteristics in comparison with conventionally prepared and subsequently acid-reduced polyesterols (Test 15 and 16).

We claim:

1. An oligomeric carbodiimide having an average degree of condensation of from 2 to 30, obtainable by oligocondensation of
   a) from 40 to 100 mol % of 2,4'-diisocyanatodiphenylmethane or of a 3,3',5,5'-tetra-$C_1$-$C_4$-alkyl-4,4'-diisocyanatodiphenylmethane and
   b) from 0 to 60 mol % of a further bi- or polyfunctional aromatic isocyanate and
   c) optionally, complete or partial reaction of the remaining free isocyanate groups of the oligomers with an aliphatic, araliphatic or cycloaliphatic alcohol or amine.

2. An oligomeric carbodiimide as claimed in claim 1, obtainable from 100 mol % of component (a).

3. An oligomeric carbodiimide as claimed in claim 1 obtainable by reacting the remaining free isocyanate groups of the oligomer from component (a) or (b) with a $C_1$-$C_{12}$-alkanol as component (c).

4. An oligomeric carbodiimide as claimed in claim 1 having an average degree of condensation of from 2 to 10.

5. A process for the preparation of an oligomeric carbodiimide by condensation of bi- or polyfunctional aromatic isocyanates, wherein
   a) from 40 to 100 mol % of 2,4'-diisocyanatodiphenylmethane or of a 3,3',5,5'-tetra-$C_1$-$C_4$-alkyl-4,4'-diisocyanatodiphenylmethane and
   b) from 0 to 60 mol % of a further bi- or polyfunctional aromatic isocyanate are used as starting materials and
   c) the free isocyanate groups of the resulting oligomers are, optionally, completely or partially reacted with an aliphatic, araliphatic or cycloaliphatic alcohol or aminex; or not more than 60% of the isocyanate groups of component (a) or (b) are first reacted with component (c) before the condensation, the condensation is then carried out and, optionally, the remaining still free isocyanate groups of the oligomers are then reacted with component (c).

6. A process as claimed in claim 5, wherein the condensation is carried out in the presence of a phospholene oxide.

7. A substance sensitive to hydrolysis, containing an oligomeric carbodiimide as claimed in claim 1 as a stabilizer against hydrolytic degradation.

8. A polymer containing ester groups, which contains an oligomeric carbodiimide as claimed in claim 1 as a stabilizer against hydrolytic degradation.

9. A process for the preparation of a mono-, oligoor polyester by reacting the corresponding acid or acid derivative with an alcohol, wherein, after reaching the desired conversion, the esterification reaction is terminated by adding an oligomeric carbodiimide as claimed in claim 1.

10. An oligomeric carbodiimide as claimed in claim 2, having an average degree of condensation from 2 to 10.

11. A substance sensitive to hydrolysis, containing an oligomeric carbodiimide as claimed in claim 2 as a stabilizer against hydrolytic degradation.

12. A polymer containing ester groups, which an oligomeric carbodiimide as claimed in claim 2 as a stabilizer against hydrolytic degradation.

13. An oligomeric carbodiimide as claimed in claim 2, comprising a mono-, oligo-, or polyester prepared by reacting a corresponding acid or acid derivative with an alcohol, and after reaching the desired conversion, the esterification reaction is terminated by adding said oligomeric carbodiimide.

14. An oligomeric carbodiimide as claimed in claim 2, obtainable by reacting the remaining free isocyanate groups of the oligomer from component (a) or (b) with a $C_1$-$C_{12}$-alkanol as component (c).

15. An oligomeric carbodiimide as claimed in claim 3, having an average degree of condensation of from 2 to 10.

16. A substance sensitive to hydrolysis, containing an oligomeric carbodiimide as claimed in claim 3 as a stabilizer against hydrolytic degradation.

17. A polymer containing ester groups, which contains an oligomeric carbodiimide as claimed in claim 3 as a stabilizer against hydrolytic degradation.

18. An oligomeric carbodiimide as claimed in claim 3, comprising a mono-, oligo-, or polyester prepared by reacting a corresponding acid or acid derivative with an alcohol, and after reaching the desired conversion, the esterification reaction is terminated by adding said oligomeric carbodiimide.

19. A substance sensitive to hydrolysis, containing an oligomeric carbodiimide as claimed in claim 4 as a stabilizer against hydrolytic degradation.

20. A polymer containing ester groups, which contains an oligomeric carbodiimide as claimed in claim 4 as a stabilizer against hydrolytic degradation.

21. An oligomeric carbodiimide as claimed in claim 4, comprising a mono-, oligo-, or polyester prepared by reacting a corresponding acid or acid derivative with an alcohol, and after reaching the desired conversion, the esterification reaction is terminated by adding said oligomeric carbodiimide.

22. A substance sensitive to hydrolysis, containing an oligomeric carbodiimide as claimed in claim 6 as a stabilizer against hydrolytic degradation.

23. A polymer containing ester groups, which contains an oligomeric carbodiimide as claimed in claim 6 as a stabilizer against hydrolytic degradation.

24. An oligomeric carbodiimide as claimed in claim 6, comprising the preparation of a mono-, oligo-, or polyester be reacting a corresponding acid or acid derivative with an alcohol, and after reaching the desired conversion, the esterification reaction is terminated by adding said oligomeric carbodiimide.

25. A method for removing water or traces of acid from low molecular weight or high molecular weight compounds by adding to said compounds an oligomeric carbodiimide as claimed in claim 1.

26. A method for removing water or traces of acid from low molecular weight or high molecular weight compounds by adding to said compounds an oligomeric carbodiimide as claimed in claim 2.

27. A method for removing water or traces of acid from low molecular weight or high molecular weight compounds by adding to said compounds an oligomeric carbodiimide as claimed in claim 3.

28. A method for removing water or trades of acid from low molecular weight or high molecular weight compounds by adding to said compounds an oligomeric carbodiimide as claimed in claim 4.

29. A method for removing water or traces of acid from low molecular weight or high molecular weight compounds by adding to said compounds a oligomeric carbodiimide as claimed in claim 5.

30. A method for removing water or traces of acid from low molecular weight or high molecular weight compounds by adding to said compounds an oligomeric carbodiimide as claimed in claim 6.

* * * * *